(12) United States Patent
Jamar et al.

(10) Patent No.: US 9,481,542 B2
(45) Date of Patent: Nov. 1, 2016

(54) FOIL PROCESSING DEVICE

(71) Applicant: Nederlandse Organisatie voor toegepast-natuurwetenschappelijk onderzoek TNO, Delft (NL)

(72) Inventors: Jacobus Hubertus Theodoor Jamar, Delft (NL); Irene Kaashoek, Delft (NL)

(73) Assignee: NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 120 days.

(21) Appl. No.: 14/377,827

(22) PCT Filed: Feb. 7, 2013

(86) PCT No.: PCT/NL2013/050071
§ 371 (c)(1),
(2) Date: Aug. 8, 2014

(87) PCT Pub. No.: WO2013/119117
PCT Pub. Date: Aug. 15, 2013

(65) Prior Publication Data
US 2015/0018188 A1    Jan. 15, 2015

(30) Foreign Application Priority Data

Feb. 10, 2012 (EP) .................... 12154868

(51) Int. Cl.
*B65H 29/24* (2006.01)
*B65H 37/04* (2006.01)
(Continued)

(52) U.S. Cl.
CPC ............... *B65H 37/04* (2013.01); *B26D 5/007* (2013.01); *B26D 5/34* (2013.01); *B26D 7/32* (2013.01);
(Continued)

(58) Field of Classification Search
CPC .. B65H 37/04; B65H 23/032; B65H 23/188; B65H 23/1886; B65H 29/241; B65H 39/14; B65H 39/16; Y10T 29/53; Y10T 29/534
See application file for complete search history.

(56) References Cited

U.S. PATENT DOCUMENTS 5,282,407 A     2/1994   Arikita
5,584,954 A *  12/1996   van der Klugt .. A61F 13/15601
                                          156/163
(Continued)

FOREIGN PATENT DOCUMENTS

CN    101683935 A    3/2010
DE    19847249 A1    4/2000
(Continued)

OTHER PUBLICATIONS

Office Action dated Oct. 26, 2015 for CN Application 201380019106.X.
(Continued)

*Primary Examiner* — Christopher Besler
(74) *Attorney, Agent, or Firm* — Knobbe, Martens, Olson & Bear, LLP

(57) ABSTRACT

A foil processing device comprises at least two supply units for supplying at least two foils for processing, a processing unit for processing the at least two foils to each other and a transport unit for transporting the foils from the supply unit to the processing unit. At least one of the foils is segmented comprising mechanically weak zones separating subsequent foil segments for enabling real-time correction of a relative position between the foils. The transport unit includes at least two support members for supporting at least two subsequent segments of the segmented foil.

15 Claims, 3 Drawing Sheets

(51) Int. Cl.
- *B65H 39/14* (2006.01)
- *B65H 39/16* (2006.01)
- *B26D 5/00* (2006.01)
- *B26D 5/34* (2006.01)
- *B26F 1/20* (2006.01)
- *B32B 38/18* (2006.01)
- *B65H 37/00* (2006.01)
- *B26D 7/32* (2006.01)
- *B65H 23/032* (2006.01)
- *B65H 23/188* (2006.01)
- *B32B 38/00* (2006.01)

(52) U.S. Cl.
CPC ............ *B26F 1/20* (2013.01); *B32B 38/1841* (2013.01); *B65H 23/032* (2013.01); *B65H 23/188* (2013.01); *B65H 23/1882* (2013.01); *B65H 29/241* (2013.01); *B65H 37/002* (2013.01); *B65H 39/14* (2013.01); *B65H 39/16* (2013.01); *B26D 2007/322* (2013.01); *B32B 38/0004* (2013.01); *B32B 38/1858* (2013.01); *B65H 23/1886* (2013.01); *B65H 2301/44334* (2013.01); *B65H 2301/44336* (2013.01); *B65H 2301/5161* (2013.01); *B65H 2404/23* (2013.01); *B65H 2406/33* (2013.01); *B65H 2406/351* (2013.01); *B65H 2511/20* (2013.01); *B65H 2511/512* (2013.01); *B65H 2701/1864* (2013.01); *B65H 2801/61* (2013.01)

(56) References Cited

U.S. PATENT DOCUMENTS

| | | |
|---|---|---|
| 6,971,429 B2 | 12/2005 | Keil et al. |
| 7,640,836 B1 | 1/2010 | Raney et al. |
| 7,654,427 B1 | 2/2010 | Tsai et al. |
| 2002/0103468 A1 | 8/2002 | Nakakado |
| 2003/0089210 A1 | 5/2003 | Sawai |
| 2010/0043659 A1 | 2/2010 | Brost et al. |
| 2010/0072245 A1 | 3/2010 | Kim et al. |
| 2010/0310993 A1 | 12/2010 | Yamaguchi |

FOREIGN PATENT DOCUMENTS

| | | |
|---|---|---|
| EP | 0 668 131 A1 | 8/1995 |
| JP | 57077151 | 5/1982 |
| JP | 59043757 | 3/1984 |
| JP | 2005116611 A | 4/2005 |

OTHER PUBLICATIONS

International Search Report dated Sep. 3, 2013 for PCT/NL2013/050071.

* cited by examiner

FOIL PROCESSING DEVICE

This application is the U.S. National Phase of International Application No. PCT/NL2013/050071, filed Feb. 7, 2013, designating the U.S. and published in English as WO 2013/119117 on Aug. 15, 2013 which claims the benefit of European Patent Application No. 12154868.9 filed Feb. 10, 2012.

FIELD OF THE INVENTION

The invention relates to a foil processing device, such as a foil laminating device, a foil cutting device or a foil printing device.

BACKGROUND OF THE INVENTION

Flexible electronic products often comprise multiple foils which relate to different functionalities. Such an electronic product could for example comprise a foil with an OLED functionality, a foil having printed photodiodes and a driver foil. Such configuration may be used for manufacturing flexible displays, for example.

It will be appreciated that all these foils need to be combined with each other to yield the final product. Such combining is often effectuated using a lamination step. Accordingly, it may be required to ensure optical, fluidic or electrical interconnection between the foils. These steps may be carried out under aligned lamination.

In general, such lamination may be carried out piece-wise, i.e. when one or both laminands comprise consecutive segments of limited size, for example the segments may be about 30 cm long. These segments are preferably interconnected by non-functional areas, which may be about 1 cm long. Accordingly, an independent alignment is required per segment as the non-functional areas may be mechanically weak are deformable.

An embodiment of a foil processing device is known from U.S. Pat. No. 7,640,836. The known device relates to a web processing apparatus configured to enable relatively high speed operations. In the known device a processing station is provided arranged a vacuum hold down plate which is arranged for receiving and holding an image bearing incremental segment of the web. During operation, in feed and out feed tension on the web is released which a segment of the web is held by the hold down plate. The hold down plate with a segment of the web thereon may be selectively shifted about X, Y axes and rotated about the θ axis for bringing the image on the web segment into alignment with a web processing component at the processing station. The known device is arranged to enable substrate handling for performing coarse and fine alignment of two foils having respective patterns.

It is a disadvantage of the known device that it is provided with a complex architecture of cooperating parts, which may be less desirable from the maintenance considerations and due to elevated costs.

SUMMARY OF THE INVENTION

It is an object of the invention to provide an improved foil processing device enabling high alignment accuracy and having simplified architecture.

To this end the device according to the invention comprises at least two supply units for supplying at least two foils for processing, a processing unit for processing the at least two foils to each other, a transport unit for transporting the said foils from the supply unit to the processing unit, wherein at least one of the said foils is segmented comprising mechanically weak zones separating subsequent foil segments for enabling real-time correction of a relative position between the said foils, wherein the transport unit comprises at least two support members for simultaneous supporting at least two subsequent segments of the segmented foil in use.

The technical measure of the invention is based on the insight that when a segment number N is being processed, for example in a pressing pinch, a position of one of the two cooperating foils in the next segment (N+1) must be adjusted for correct alignment for segment N+1. One method to do this is having weak zones in the adjusted foil, and controlling the tension in the foil before the pressing pinch to stretch the weak zone in the transition between segments N and N+1 to the amount required for perfect alignment. This leads to a problematic compromise for the weak zones, which on one hand must be strong enough to allow handling of the roll of foil through the machine, but on the other hand must have a stiffness that is much lower (negligible) compared to the stiffness of the non-weakened foil. Also tolerances in the weak zones' stiffness make the control of the adjustment difficult. These problems in particular prevent performing the foil processing at high production speeds (e.g. 100 m/min).

It will be appreciated that the processing device according to the invention may relate either to a lamination device, a cutting device or a printing device. Although a reference to any particular processing device may be made in the description, it will be further appreciated that either lamination, cutting or printing device is contemplated.

In accordance with an aspect of the invention a processing device is provided that carries out aligned processing at relatively very high production speeds.

Accordingly, the device according to an aspect of the invention is configured to fixate the subsequent segments of the adjusted foil on separate adjustable support members, such as clamps. At least 2 clamps may be used, so that while one clamp is involved in the pressing pinch for fixating segment N, one or more other clamps are available for preparing segment(s) N+1, N+2, etc.

In an embodiment of the device according to the invention the support members are adapted to substantially firmly affix on the said subsequent segments.

It is found to be advantageous to arrange the support members that they not only exhibit a support function but also firmly engage with a foil segment. For example, the support members may be provided with a suction unit for engaging with the respective segments. For this purpose a surface of the support members engaging the segments may comprise a porous material. It is found that the porous material may advantageously be used to cooperate with a suitable pump for evacuating air via the porous material thereby exhibiting a due sucking force on the segment of the foil In a further embodiment of the device according to a further aspect of the invention the support members are arranged on a rotating member.

It is found to be particularly advantageous to provide the support members on a rotating member, which may be embodied as a conveyor belt. As a result, the support member may suitably conduct the segments from the supply unit towards the laminating stage.

Preferably, a plurality of support members is provided, wherein the support members are distributed over an outer surface of the rotating member for synchronizing with the segments.

In this embodiment the support members may engage more than two subsequent segments of the foil, which may increase the production speed and may reduce alignment errors because more than two subsequent segments are transported to the processing stage in a controlled way.

In a particular embodiment, of the device the support members may form at least a part of an outer surface of a rotating body.

For example, the support members may be mounted on a wheel and form the outer surface of the wheel. Preferably, the support members are spring-biased irrespective whether they are wheel-based or form part of another rotating structure, such as a conveyor belt.

Preferably, a surface of the support members engaging with the segments is convex.

This feature is found to be particularly advantageous for rotating support members, as a convex contact surface of the support member would not introduce any deformation of the segment area upon engagement therewith.

In a still further embodiment of the device according to the invention, the support members are rotating over a centre of rotation substantially along a circle having a radius, the said surfaces having a radius of curvature meeting the radius of the said circle.

It is found that when the curvature of the support surfaces substantially matches the curvature of the rotating movement of the support members a still further improved alignment quality may be achieved.

In a still further embodiment of the device according to the invention, the transport unit comprises a conveyor belt on which the support members are mounted, a position of the support members being adjustable with respect to the conveyor belt.

This technical measure is based on the insight that a due and reliable alignment adjustment may be received when the support members are displaceably arranged on the conveyor belt. It will be appreciated, that although a reference to a conveyor belt is made, other embodiments of the transport unit are envisaged.

Preferably, the support members are automatically actuatable for enabling their displacement. Accordingly, when a misalignment is determined the respective actuators of the support members may be energized and the position of the segment supported by a support member may be adjusted in space. Preferably, the support members are adapted to enable a three-dimensional correction of a position of the foil segment.

In a still further embodiment of the device according to the invention, it further comprises a cutting unit for disrupting the said weak zones.

This feature is advantageous when correction of a position of an isolated segment in space is desirable. Preferably, the cutting unit comprises a suitable laser adapted to cut the weakened zone of the foil.

In a still further embodiment of the device according to the invention, wherein one or more foils are provided with alignment marks, the device further comprises an identification unit for enabling alignment between the said foils.

It is found to be advantageous to provide an automatic unit adapted for detecting and signaling possible misalignments of the foils. Preferably, the identification unit comprises a camera, which may be suitably calibrated to determine a position of the alignment marks on the foils.

In order to enable an automatic signaling of the misalignment between the foils, the device according to a still further aspect of the invention further comprises a processor for analyzing data from the identification unit, said processor being further adapted to control a position of the support members with respect to the conveyor belt for aligning the said foils.

Preferably, the processor is provided with one or more tolerance tables wherein the allowable misalignments are listed. It may be possible that for the same foils different alignment tolerances may apply when different class of devices may be manufactured. The processor is preferably arranged to determine whether the data received from the identification unit falls within the tolerable misalignments and if not, to provide a control signal to the support member for suitably displacing the segment.

In a particular embodiment of the device according to a still further aspect of the invention the supporting members in use, when engaging the foil, are arranged to be transported to a position to form a part of the processing unit, such as a lamination pinch, a cutter or a printing unit.

It is found to be particularly advantageous when the supporting member forms a part of the processing stage, notable a pressing pinch. Due to this feature the foil segment, being suitably aligned, does not undergo any displacement prior to suitable processing.

These and other aspects of the invention will be discussed with reference to drawings wherein like reference signs correspond to like elements. It will be appreciated that the drawings are presented for illustrative purposes only and may not be used for limiting the scope of the appended claims.

DETAILED DESCRIPTION OF THE DRAWINGS

Figure 1:
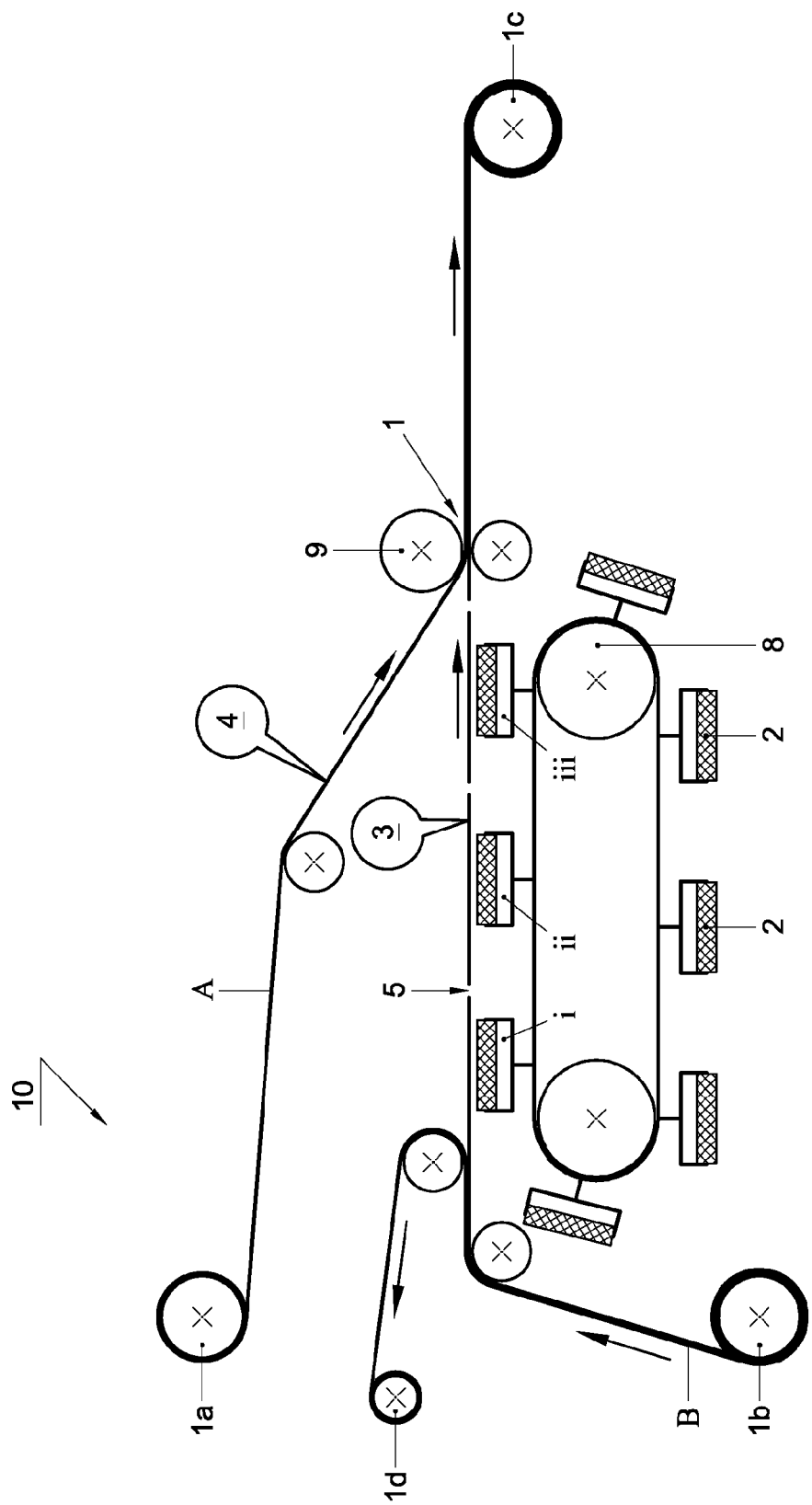
FIG. 1 presents in a schematic way an embodiment of a lamination device according to a first aspect of the invention.

FIG. 1 presents in a schematic way an embodiment of a lamination device 10 according to a first aspect of the invention. FIG. 1 presents schematically an exemplary embodiment wherein two foils A, B are brought together in the pressing pinch 1. The first foil A is supplied from a first supply unit 1a and the second foil B is supplied from a second supply unit 1b. Typically the foils A, B are fixed to each other by a suitable pressure sensitive adhesive (PSA) at the pressing pinch 1. After the foils A, B have been laminated to each other at the pressing pinch 1, they are immovably fixed to each other and leave the pressing pinch 1 at an output laminate collector roll 1c.

It is possible that one or both foils A, B comprise a release liner, which may be collected at a stage 1d prior to alignment and lamination steps.

It will be appreciated that for the purposes of the present exemplary embodiment the foil A is assumed to be leading and the foil B is assumed to be adjusted towards the foil A for correct alignment. However, different arrangements are envisaged as well.

In accordance with the invention the foils B is supported by a transport unit 8 comprising a number of supporting members 2. It will be appreciated that the invention may be implemented either with two supporting members or with a suitable plurality of supporting members. It is found that for foils having segments which are about 30 cm long, 4-6 supporting members may be sufficient.

Accordingly, the support members 2 are arranged to be displaceable with respect to the foil B using a suitable transportation system, such as a conveyor belt. Preferably, the support members 2 are embodied as vacuum clamps, however, they may engage to the foil using a different principle. For example, electrostatic forces may be used. The support members 2 enable simultaneous supporting of at least two subsequent foil segments during operation of the lamination device 10.

In the present embodiment the support members may be provided with a porous material facing the foil and conceived to engage with it. The porous material may be used for exhibiting a suitable suction force on the foil. Preferably, for the porous material Metapor or the like is used.

More in particular, the support members 2 may be cooperating with actuators (not shown) that may be arranged to allow the support member to be moved with respect to the conveyor belt. For example a displacement of about 1 cm longitudinally or transversely may be enabled.

In use, when a support member arrives at the position i it is moving the substantially the same speed as the foil B, the vacuum (or any other affixing force or means) is switched on. Somewhere between the positions i and ii, a cut 5 (full or partial) may be made in the foil B to weaken an area in between two segments, for example using suitable laser cutting. After this the engaged segment of the foil B is movable with respect to the rest of the foil. Alternatively, foil B may have areas that have been weakened beforehand, so a cutting device is not necessary for making a segment of foil B independently movable with respect to the rest of the foil.

Next, snapshots may be taken by a suitable identification unit of the markers provided on the foils A and B. For example suitable camera's 3 and 4 may be used for this purpose. The information from the camera's provides input regarding whether foils A and B are situated within tolerable alignment boundaries.

In case it is determined that the foils A and B are not suitably aligned, the actuators (not shown) of the support members may be energized to suitably shift and/or rotate the foils with respect to each other. It will be appreciated that although in this embodiment foil B is being displaced it is also possible that both foils are being displaced.

After that alignment is achieved, the foil B is transported further until its leading edge engages the pinch. Accordingly, due to a proper synchronization of the support member, the vacuum (or any other retaining means) is switched off and the lamination process continues. The supporting member is being conducted away from the segment and is provided again for engaging a new segment of the foil B. Preferably, the support members 2 are rotatable about one or more substantially circular bodies 8.

It is found that due to the fact that the support members are distributed over the length of the transport means, the alignment steps are also distributed over the length of the foil, and therefore, are distributed in time. Therefore, sufficient time period is available for effectuating each of the above mentioned alignment steps. Therefore, a substantial increase in the overall feed speed of the foils may be achieved as the alignment procedure does not hamper the speed of propagation of the foil from the supply unit to the lamination stage.

It will be appreciated that the approach according to the invention is different from the methods known in the art. In the prior art a subsequent segment of the foil is clamped in the pinch roll at the time when the previous piece is still in the pinch. In this situation, the adjustment of the next piece can start after the previous piece has fully left the pressing pinch. Thus, the time available for the adjustment is limited to the time corresponding to the length of the transition zone between the subsequent segments of the foil, which is typically 1 cm. At general foil speed of 100 m/min there is just 6 ms available for the adjustment, which may be unacceptable.

On the contrary, in accordance with the invention the adjustment steps can be spread over a larger length of the foil. In experimental trials, adjustment over a length of about 1 meter was feasible comprising a plurality of support members 2 which were cooperating with 3 or 4 segments each about 30 cm long. Accordingly, in the device according to the invention there were about 600 ms available for effectuating due alignment between the foils A and B.

Figure 2:
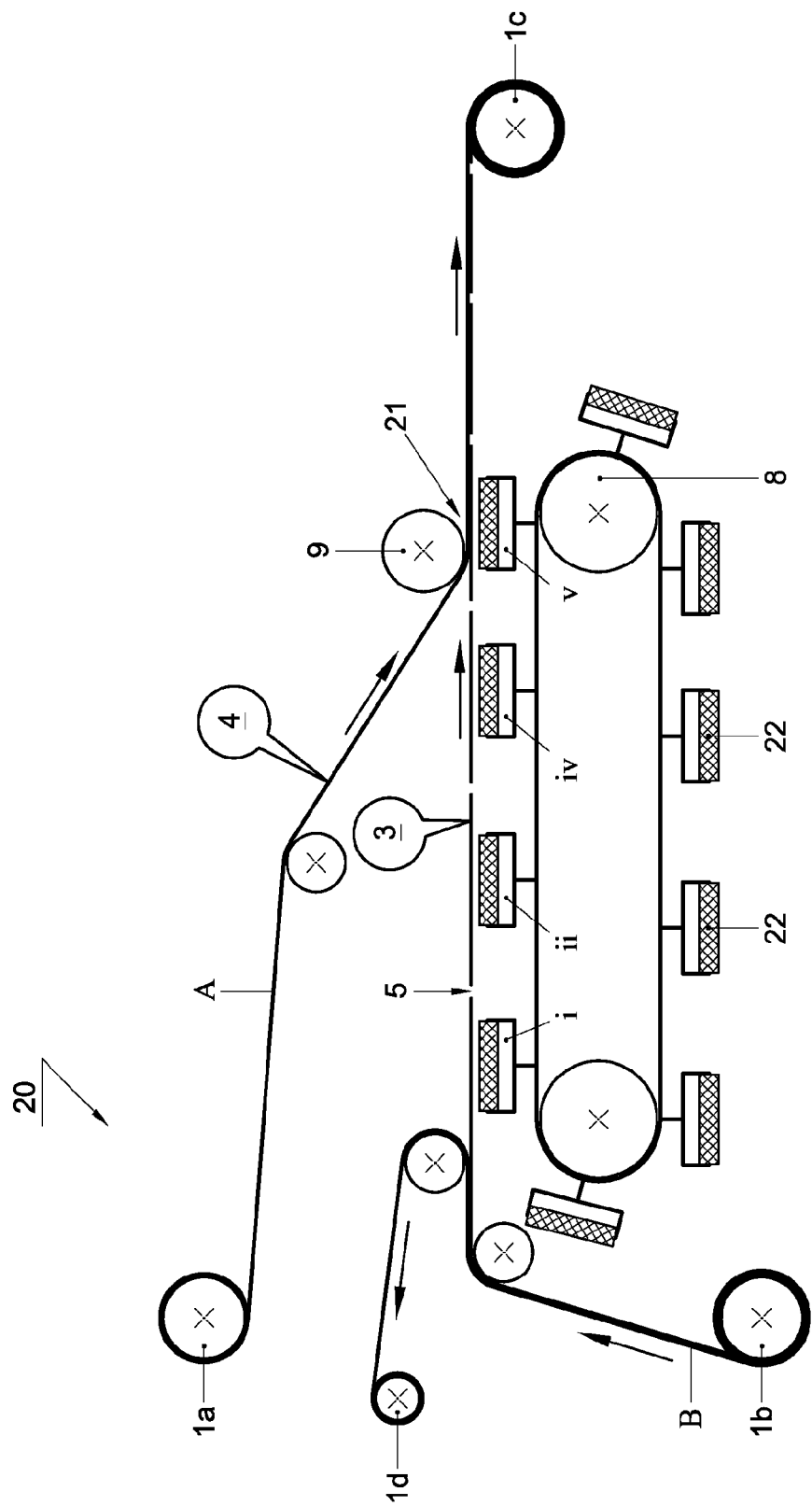
FIG. 2 presents in a schematic way a further embodiment of the lamination device according to a further aspect of the invention.

FIG. 2 presents in a schematic way a further embodiment of the lamination device 20 according to a further aspect of the invention. In this embodiment a further improvement of the device of FIG. 1 is provided, wherein the segment of the foil is prevented from hanging freely in space at the pressing pinch.

In accordance with the present aspect of the invention the support member 22 forms part of the pressing pinch 21 as it is allowed to follow the foil B as far as the pressing pinch 22, see stages iv, v of the support member 22.

For the sake of brevity the similar features of the device 20 with respect to the device 10 shown in FIG. 1 are provided with the same reference numerals as in FIG. 1.

The present embodiment has the following advantages: by using the support members as a part of the pressing pinch the surface of the support members 22 can perform the function of a pressing roller in the pressing pinch. Accordingly, due to a certain elongation of the support member in the direction of the foil transport, free hanging leading ends of the foil B in the pressing pinch are avoided. This feature additionally improves the alignment quality. It will be appreciated that a longitudinal dimension of the support member may be as long as about the length of the foil segment which is being laminated. Accordingly, for a foil segment of about 30 cm the support member may be as large as about 30 cm.

Figure 3:
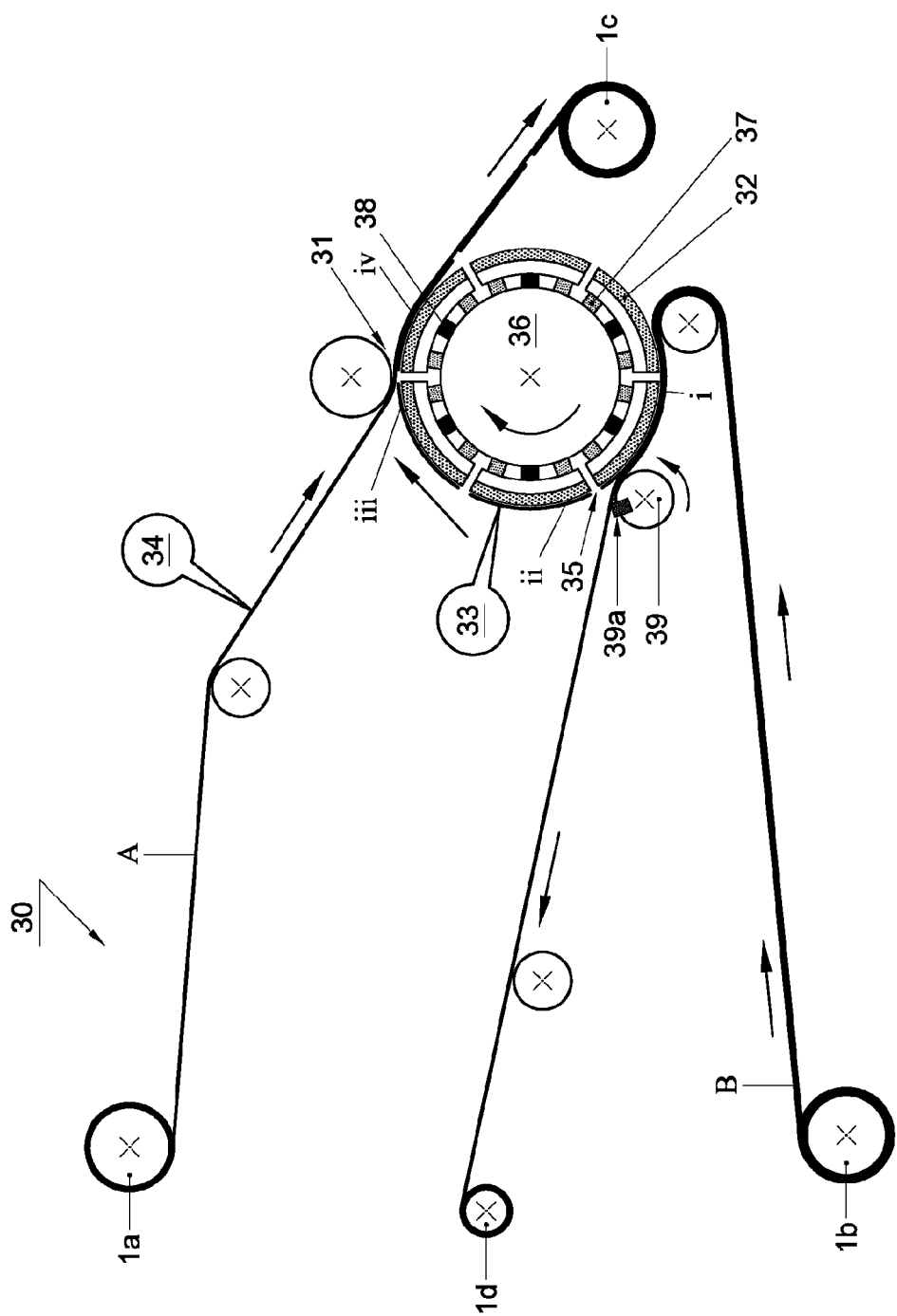
FIG. 3 presents in a schematic way a still further embodiment of the lamination device according to a still further aspect of the invention.

FIG. 3 presents in a schematic way a still further embodiment of the lamination device 30 according to a still further aspect of the invention. In this particular embodiment a roller 36 provided with a plurality of support members 22 is depicted. It will be appreciated that the number of the support members 22 provided on the outer surface of the roller 36 may be optimized in dependence with the geometry of the device 30. In general about 6 support members may be used.

Also in this embodiment it may be advantageous to provide the outer surface of the support members 32 with a porous material for improving suction efficiency of the support members when they are implemented as suction units. The suction force may be set on and off in synchronization with the transport of the foil B and in dependence when an engagement between the support members 22 and the foil B is desired.

It is found to be advantageous to allow the support members 32 to cooperate with support units 37 which may be adapted to provide specific mechanical bias to the support members 32. Alternatively, the support units 37 may be implemented as suitable bearings on which the support member 32 may slide when the actuators for displacing the support members are energized.

The sliding surfaces are preferably configured to have a curvature which is substantially centered on the rotation axis of the roller 36.

Each support member 32 may comprise one or more actuators 38 that may be configured to allow the support members to be moved with respect to the outer surface of the roller body 36 on which the support member rests. Preferably, about 1 mm displacement in two-dimensions is enabled. More preferably, a rotational degree of freedom is provided as well.

Accordingly, when the support member 32 arrives at the position i, the vacuum may be switched on causing the foil B to be fixed to the support member 32. When the support member is dwelling between the positions i and ii, a cut 35 may be provided in foil B, for example using a laser cutting. As a result, the affixed segment of the foil B is movable with respect to the rest of the foil B by means of the displaceable support member 32.

Next, suitable snapshots may be taken of the alignment marks provided on the foils A and B, the data can be suitably analyzed and in dependence on the outcome the actuators of the support members 32 may be energized for one-, two- or three-dimensional displacement of the segment of the foil B.

After the correction step (for the clarity and simplicity explained with reference to foil B) the foils A and B meet at the pressing pinch 31. Preferably, the support member 32 is still activated engaging the foil during the processing step at the pressing pinch 31. After the foils are duly laminated, the vacuum may be switched off, for example near the terminal region iv. The laminated foil may be collected at a collection roll 1*c*.

The present embodiment has the following advantages. First, after the support member is ready with one process cycle it is automatically transported back to the start position for engaging a fresh segment of the foil B. The whole arrangement of the roller 36 cooperating with the support members 32 and the pressing pinch 31 may be dynamically balanced and can therefore move with very high rotational speed without causing vibrations to surrounding parts of the device 30.

The mechanical complexity of the device 30 is substantially reduced with respect to the prior art devices as well as with respect to the conveyor-based embodiments.

By providing the support members 32 with a convex outer surface meeting the curvature of the roller 36 the transport members 32 may be used as a part of the pressing pinch 31 without inducing any deformations on the laminated foils. In addition, any free hanging leading or trailing ends of the laminands are avoided because the support members 32 represent in fact a substantially continuous body.

In a still further embodiment of the device according to the invention the support members 32 may be provided with a substantial unstiffness for torsional forces. Further, it may be advantageous to carry out the cut partially along the foil B, for example, when the foil B has release liners on its both sides. In a still further embodiment a roller 39 may be provided having punching members 39*a* adapted to provide a partial cut in the foil B. more in particular, it may be advantageous to carry out a coarse alignment between the foils A and B before the segments of the foil B are engaged by the supporting members 32.

While specific embodiments have been described above, it will be appreciated that the invention may be practiced otherwise than as described. Moreover, specific items discussed with reference to any of the isolated drawings may freely be inter-changed supplementing each other in any particular way. The descriptions above are intended to be illustrative, not limiting. Thus, it will be apparent to one skilled in the art that modifications may be made to the invention as described in the foregoing without departing from the scope of the claims set out below.

What is claimed is:

1. A foil processing device comprising:
    at least two supply units for supplying at least a first foil and a second foil for processing;
    a processing unit for laminating the first foil to the second foil; and
    a transport unit for transporting the first foil from one of the supply units to the processing unit,
    wherein the first foil is segmented and comprises mechanically weak zones separating subsequent foil segments for enabling real-time correction of a relative position between the foils, and
    wherein the transport unit comprises at least two support members for simultaneously supporting at least two subsequent segments of the segmented first foil in use;
    wherein the at least two support members comprise actuators configured to allow a first of the at least two support members to be moved with respect to a second of the at least two support members to align a position of a subsequent segment of the first foil, support by the second support member, with respect to the second foil while a previous segment of the first foil, supported by the first support member, is being laminated to the second foil by the processing unit.

2. The device according to claim 1, wherein the support members are adapted to substantially firmly affix on the said subsequent segments.

3. The device according to claim 2, wherein the at least two support members are provided with a suction unit for engaging with the at least two respective segments of the segmented first foil.

4. The device according to claim 1, wherein a surface of the support members engaging the segments comprises a porous material.

5. The device according to claim 1, wherein the support members are arranged on a rotating member.

6. The device according to claim 5, wherein the support members are distributed over an outer surface of the rotating member for synchronizing with the segments.

7. The device according to claim 5, wherein a surface of the support members engaging with the segments is convex.

8. The device according to claim 7, wherein the support members are rotating over a centre of rotation substantially along a circle having a radius, the said surfaces having a radius of curvature meeting the radius of the said circle.

9. The device according to claim 1, wherein the transport unit comprises a conveyor belt on which the support members are mounted, a position of the support members being adjustable with respect to the conveyor belt.

10. The device according to claim 1 further comprising a cutting unit for disrupting the said weak zones.

11. The device according to claim 1, wherein the first and/or second foils are provided with alignment marks, the device further comprising an identification unit for enabling alignment between the said foils.

12. The device according to claim 11, further comprising a processor for analyzing data from the identification unit, said processor being further adapted to control a position of the support members with respect to the transport unit for aligning the said foils.

13. The device according to claim 1, wherein the supporting members when engaging the foil are arranged to be transported to a position to form a part of the processing unit.

14. The device according to claim 1, wherein the support members form at least a part of an outer surface of a rotating body.

15. The device according to claim 1, wherein the support members are spring-biased.

* * * * *